United States Patent [19]
Irie et al.

[11] Patent Number: 5,305,051
[45] Date of Patent: Apr. 19, 1994

[54] CAMERA HAVING A VARIABLE PHOTOGRAPHING APERTURE AND CONTROL METHOD THEREOF

[75] Inventors: Hideyuki Irie; Hiroshi Kurei, both of Tokyo, Japan

[73] Assignee: Asahi Kogaku Kogyo Kabushiki Kaisha, Tokyo, Japan

[21] Appl. No.: 17,396

[22] Filed: Feb. 12, 1993

[30] Foreign Application Priority Data
Feb. 12, 1992 [JP] Japan .................................. 4-005176

[51] Int. Cl.$^5$ .......................... G03B 7/08; G03B 17/02
[52] U.S. Cl. ..................................... 354/441; 354/159; 354/195.1
[58] Field of Search ................ 354/159, 441, 442, 443, 354/410, 195.1, 195.11, 195.12

[56] References Cited
U.S. PATENT DOCUMENTS

| | | | |
|---|---|---|---|
| 4,202,624 | 5/1980 | Krehbiel | 354/159 X |
| 4,639,111 | 1/1987 | Harvey | 354/195.1 X |
| 5,010,357 | 4/1991 | Misawa | 354/159 |
| 5,086,311 | 2/1992 | Naka et al. | 354/195.1 |

*Primary Examiner*—W. B. Perkey
*Attorney, Agent, or Firm*—Sandler Greenblum & Bernstein

[57] ABSTRACT

A camera having a variable photographing aperture, including a photographing aperture size changing device that changes the size of the photographing aperture, and an exposure calculating device for calculating exposure factors including a diaphragm value and a shutter speed in accordance with the brightness of an object to be photographed. The camera further includes an exposure adjusting device which modifies the exposure factors when the photographing aperture is changed. The invention is also directed to a control method of a variable photographing aperture camera.

9 Claims, 5 Drawing Sheets

Fig. 5B ic # CAMERA HAVING A VARIABLE PHOTOGRAPHING APERTURE AND CONTROL METHOD THEREOF

BACKGROUND OF THE INVENTION

1. Field of the Invention

The present invention relates to a camera having a variable photographing aperture and a control method thereof.

This application is related to the commonly assigned application U.S.S.N. 672,901, the disclosure of which is expressly incorporated by reference herein.

2. Description of Related Art

Cameras in which a photographing aperture can be changed between a standard size (i.e., full size) and a laterally elongated size (i.e., panoramic size) are becoming popular. Cameras employing a photographing aperture changing mechanism are usually provided with a program shutter, in which exposure factors are automatically set in accordance with the brightness of an object to be photographed. However, in conventional cameras, there is no relationship between the setting operation of the exposure factors and the changing operation of the photographing aperture.

If the setting operation of the exposure factors were to be associated with the changing operation of the photographing aperture, a picture could be photographed which satisfactorily reflects a photographer's intention. In a known camera having a photographing aperture changing mechanism, a panoramic size picture of an object can be photographed which has a lateral length longer than the standard size picture. Accordingly, a photographer can accommodate a scene that is much wider than it is high. Such a picture may include only objects that are located in an infinite object distance range, but usually includes objects located at various distances. For example, large number of people are to be photographed, they may all be located at substantially the same distance, but are usually located at different distances. Under such circumstances, it is preferable that the exposure factors are set so that the depth of field for the panoramic photographing aperture is deeper than the depth of field for the standard photographing aperture.

SUMMARY OF THE INVENTION

The primary object of the present invention is to provide a camera having a variable photographing aperture in which the exposure factors can be automatically controlled in association with the selected photographing aperture size.

To achieve the object mentioned above, according to the present invention, a camera having a variable photographing aperture is provided with means for changing the size of the photographing aperture, means for calculating exposure factors, including a diaphragm value and a shutter speed, in accordance with brightness of an object to be photographed, and an exposure adjusting device for adjusting the exposure factors when the photographing aperture is changed by the photographing-aperture changing device.

Preferably, a large photographing aperture and a smaller elongated photographing aperture are provided. The elongated photographing aperture is defined by the large photographing aperture in which upper and lower portions thereof have been covered.

When the photographing aperture is changed from the large size to the small Size, the exposure adjusting device varies the exposure factors so as to increase the depth of field.

Preferably, the exposure calculating means and the exposure adjusting means determine an optimum exposure using different programs for the shutter speed and aperture at the large photographing aperture and the small photographing aperture.

In a preferred embodiment, the exposure adjusting means sets a large diaphragm value so that the depth of field is greater than a predetermined depth of field when the photographing aperture is changed from the large size to the small size by the photographing aperture changing device.

The small diaphragm value is preferably larger than F8, and more preferably larger than F11.

A lens having a variable focal length is also provided, as well as a focal length modifying device for setting the focal length of the lens to a specific focal length on a short focal length side when the photographing aperture is changed from the large size to the small size by the photographing aperture changing device.

According to another aspect of the present invention, a camera having a variable photographing aperture includes a photographing aperture changing device changing the photographing aperture between a standard size and a panoramic size, means for detecting the size of the photographing aperture selected by the photographing aperture changing device, and an exposure calculating means for determining a diaphragm value and shutter speed in accordance with brightness of an object to be photographed. The camera further includes an exposure adjusting device for adjusting a combination of the diaphragm value and the shutter speed determined by the exposure calculating device to a combination of a diaphragm value larger than the diaphragm value determined by the exposure calculating device and a shutter speed corresponding to the adjusted diaphragm value when the photographing aperture is changed from the standard size to the panoramic size by the photographing aperture changing device.

According to still another aspect of the present invention, a control method of a camera having a variable, photographing aperture and an exposure calculating device for determining exposure factors, including a diaphragm value and a shutter speed, in accordance with a brightness of an object to be photographed, is provided. The control method includes a first step in which, when the photographing aperture is changed from the standard size to the laterally elongated size, it is assumed that a photographer wants to set exposure factors in a manner such that an increased depth of field is defined. A second is included in which the exposure factors are adjusted to increase the depth of field in accordance with the assumption in the first step.

The present disclosure relates to subject matter contained in Japanese Utility Model Application No. HEI 4-5176 (filed on Feb. 12, 1992) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENT

Figure 1:
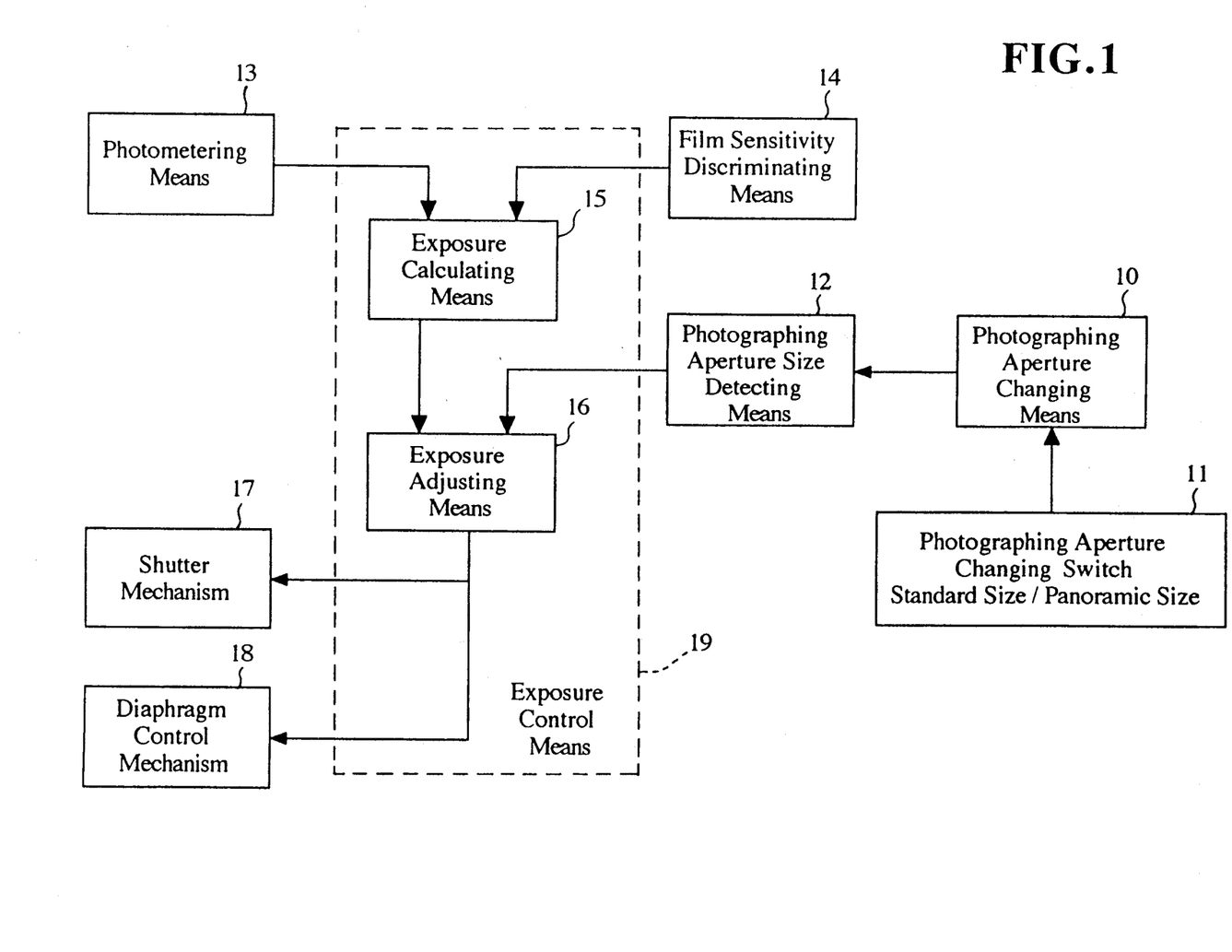
FIG. 1 is a block diagram of a main part of a camera having a variable photographing aperture, according to the present invention.
Figure 4A:
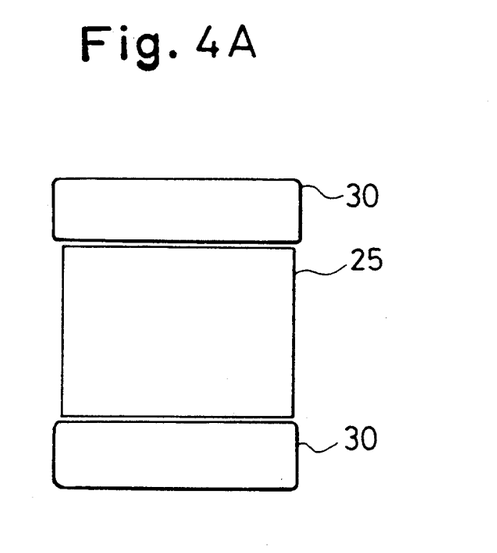
FIGS. 4A and 4B are explanatory views of the variable photographing aperture and a light intercepting plate in different operational positions; and, FIGS. 5A and 5B are conceptual views of a photographing aperture changing mechanism shown in a panoramic position and a standard position, respectively.
Figure 4B:
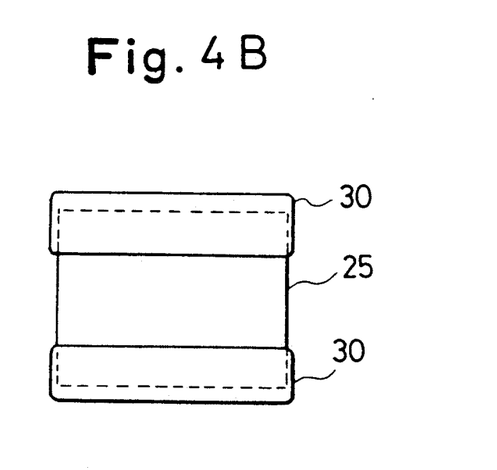

FIG. 1 is a block diagram showing main components of a variable photographing aperture camera to which an embodiment of the present invention is applied. A photographing aperture changing means 10 is adapted to change the photographing aperture between a full size (i.e., standard size of about 35 mm×24 mm) and a panoramic size in which the dimension of height is decreased. The photographing aperture changing means 10 includes, for example, a pair of movable light intercepting plates 30 which partly cover a predetermined portion of upper and lower edges of a photographing aperture 25, to partly intercept light incident thereon, so that the size of the photographing aperture can be adjusted or varied by the movement of the light intercepting plates 30, as can be seen in FIGS. 4A and 4B. Alternatively, it is possible to expose predetermined portions on the upper and lower edges of a picture frame to define the panoramic size picture frame upon panoramic photography. Moreover, it is also known to provide a small discriminating unexposed area or exposed area in the vicinity of a panoramic picture frame that can be detected by an automatic printer of a laboratory. The camera is provided on the camera body with a photographing aperture selecting switch 11, such as a slidable switch or push button, which can be manually actuated by a photographer to actuate the photographing aperture changing means 10.

Figure 5A:
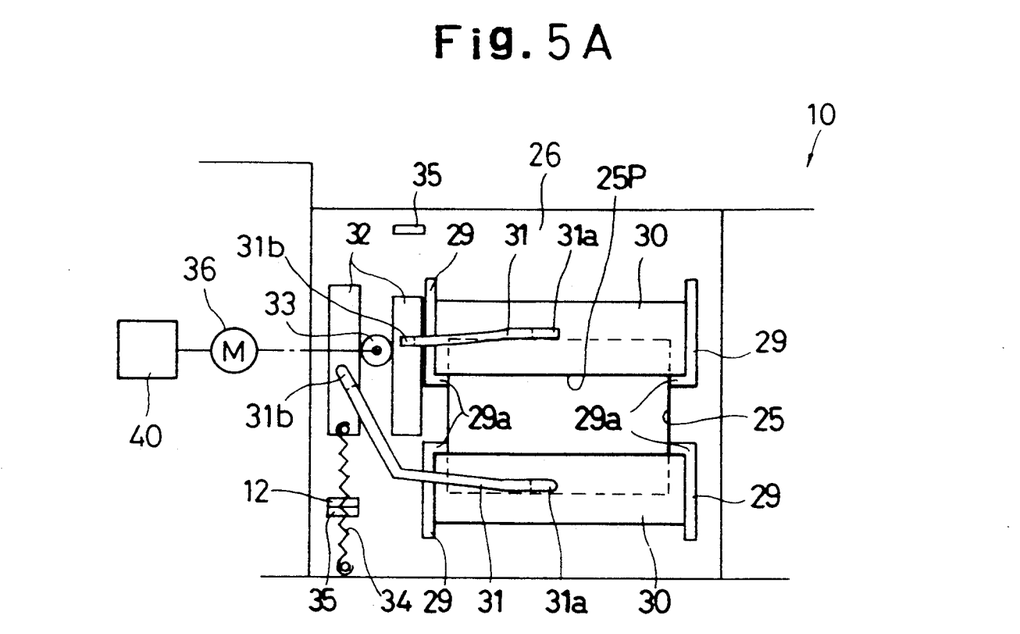
Figure 5B:
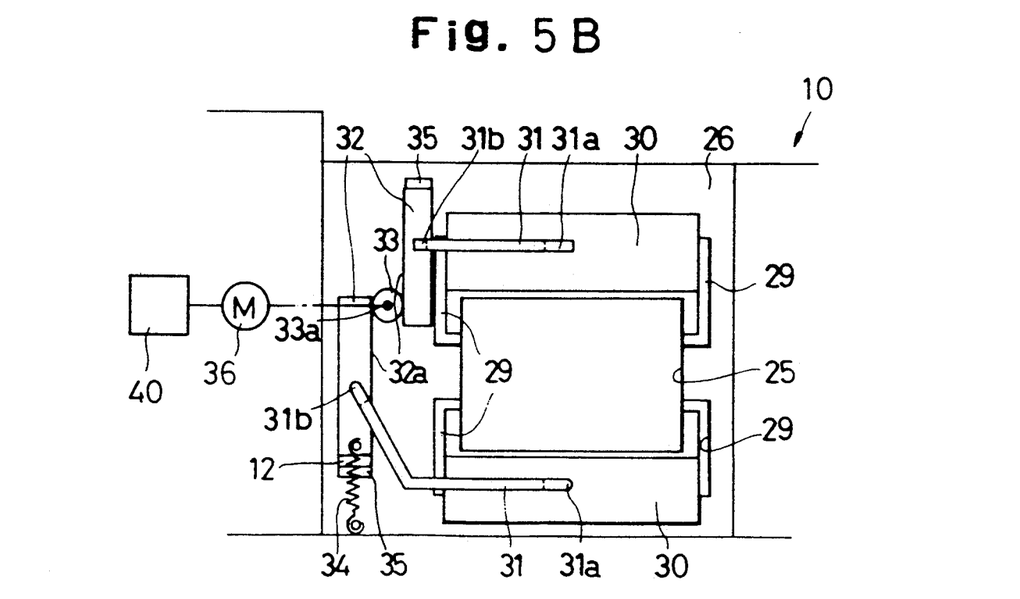

FIGS. 5A and 5B show a photographing aperture changing means 10 for mechanically switching the size of the photographing aperture between the normal and panoramic photographing positions. A camera body 26 has a photographing aperture 25 which defines the size of film frame upon taking a standard size picture.

A pair of light intercepting plate guides 29 are provided on the upper and lower sides of the aperture 25, respectively, on the front surface of the body 26. The light intercepting plate guides 29 guide a pair of upper and lower light intercepting guide plates 30 so as to move up and down (i.e., in the vertical direction). The light intercepting plates 30 can occupy a retracted position, in which the plates 30 are located out of the aperture 25, as shown in FIG. 5B, and an operative position, in which the plates 30 come into contact with stops 29a of the light intercepting plate guides 29, as shown in FIG. 5A. In the operative position, the light intercepting plates 30 partially cover the upper and lower portions of the aperture 25 defining the panoramic aperture 25P.

The pair of light intercepting plates 30 are connected to leaf springs 31, at the ends indicated 31a. The leaf springs 31 are secured to a pair of upper and lower rack plates 32, at the ends indicated 31b. The rack plates 32 have racks 32a opposed to each other, so that the racks 32a are in mesh with a common pinion 33 located therebetween. The rack plates 32 are continuously biased away from one another by a tensile spring 34. Namely, the light intercepting plates 30 are continuously biased towards the retracted position. The outward movement of the rack plates 32, towards the retracted position, is restricted by respective stops 35 provided on the camera body 26. The elasticity of the leaf springs 31 ensures that the light intercepting plates 30 come into contact with the respective stops 29a in the panoramic position shown in FIG. 5A and are retracted from the aperture 25 at the normal shot position shown in FIG. 5B.

The pinion 33 is rotated by a motor 36 whose rotation is controlled by a control means 40. The control means 40 drives the motor 36 in such a way that, for example, when the photographing aperture changing switch is switched to the panoramic position, a panoramic photographing aperture, as shown in FIG. 5A, is defined, and when the photographing aperture changing switch is switched to the standard position, a standard photographing aperture, as shown in FIG. 5B, is defined.

A switch 12 for detecting the size of the photographing aperture is provided above one of the stops 35 and is turned ON when the racks 32 are moved to the panoramic position to detect the panoramic photographing aperture.

Photographing aperture size detecting means 12 detects the size of the photographing aperture (i.e., standard size or panoramic size) which is controlled by the photographing aperture changing means 10. To this end, the camera body is provided with a switch or the like, that is associated with the operation of the photographing aperture changing switch 11 provided on the camera body to actuate the photographing aperture changing means 10. Alternatively, in the case where the photographing aperture changing means 10 is comprised of the light intercepting plates 30, it is also possible to provide switches or sensors, etc., in the vicinity of the light intercepting plates 30.

A photometering means 13 detects the brightness of an object to be photographed and transmits the brightness data to an exposure calculating means 15. The photometering means 13 is comprised of, for example, a light receiver provided on the camera body to measure the object brightness, as is well known.

A film sensitivity discriminating means 14 detects sensitivity data of a photographing film to be used and transmits the film sensitivity data to the exposure calculating means 15. Film sensitivity can be discriminated, for example, by DX codes provided on a side face of a patrone of a 35 mm film. The DX codes are read by a plurality of contact pins provided in a patrone loading chamber of the camera body to come into contact with the DX codes. Alternatively, it is possible to provide a selection button or the like on the camera body, so that the selection button is manually actuated by a photographer to directly detect the film sensitivity.

The exposure calculating means 15 calculates a diaphragm value and a shutter speed in accordance with the brightness data sent from the photometering means 13 and the film sensitivity data sent from the film sensitivity discriminating means 14. The calculation of the exposure calculating means 15 can be carried out, for example, by a micro-computer, etc.

An exposure adjusting means 16 adjusts or modifies the diaphragm value and the shutter speed determined by the exposure calculating means 15, so that the depth of field increases, in accordance with the detection results of the photographing aperture size detecting means 12 when the panoramic photographing aperture is selected. In practice, the diaphragm value calculated by the exposure calculating means 15 is replaced with a larger diaphragm value in the adjustment or correction operation, and a shutter speed corresponding to the adjusted diaphragm value is then calculated. The diaphragm value and the shutter speed thus corrected are fed to a diaphragm control mechanism 18 and a shutter mechanism 17, per se known, respectively. The correction effected by the exposure adjusting means 16 is carried out in accordance with the program diagram shown in FIG. 3. The diagram 20 corresponds to the standard photographing aperture and the diagram 21 corresponds to the panoramic photographing aperture.

Figure 3:
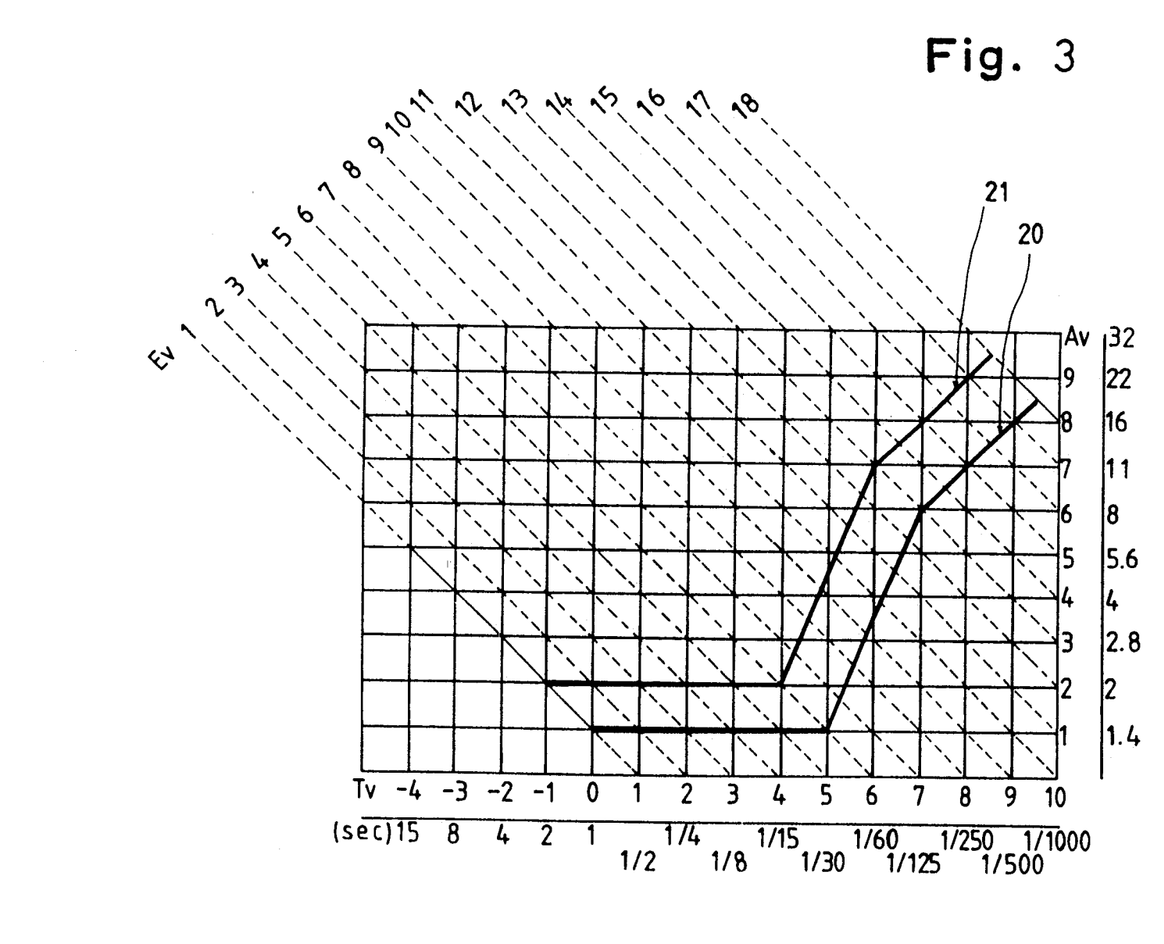
FIG. 3 is a program diagram of the variable photographing aperture camera shown in FIG. 1.

As can be seen in FIG. 3, in the correction operation by the exposure adjusting means 16, when the panoramic photographing aperture is selected, 1 APEX value is added to the Av value of the standard photographing aperture size, and 1 APEX value is subtracted from the Tv value of the standard photographing aperture size. The calculation in the exposure adjusting means 16 is carried out, for example, by a micro computer. It is possible to provide a single exposure controller 19 in which both the calculations of the exposure calculating means 15 and the exposure adjusting means 16 are effected by the same micro computer.

Figure 2:
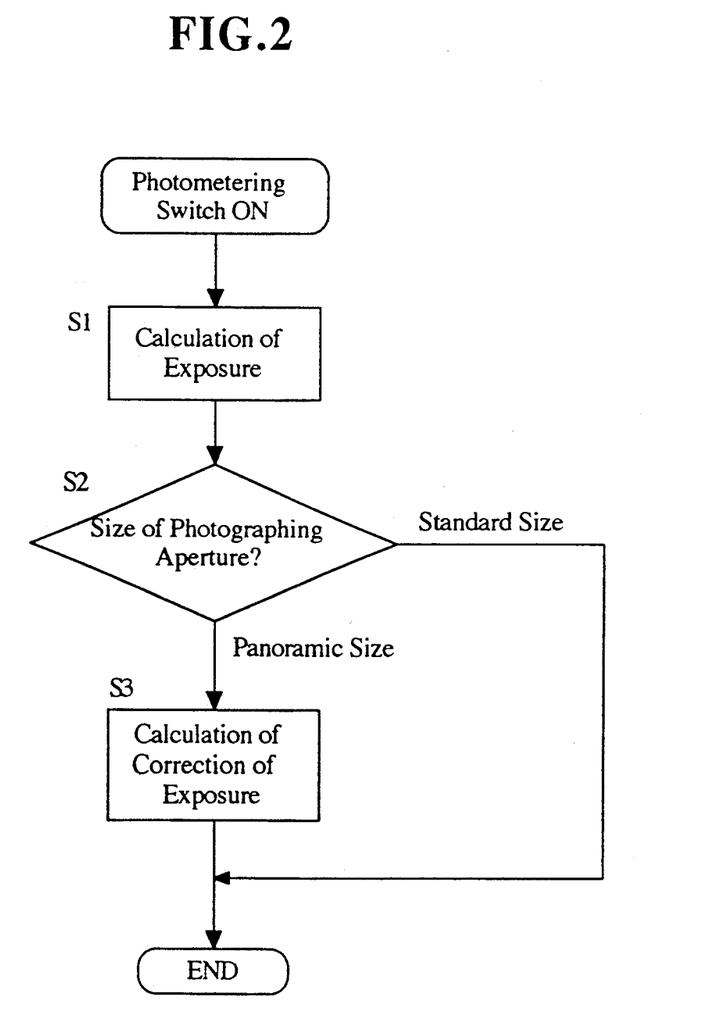
FIG. 2 is a flow chart of a main operation of the variable photographing aperture camera shown in FIG. 1.

FIG. 2 shows a flow chart of a main operation of the variable photographing aperture camera according to the present invention.

When the photometering switch, associated with a release button provided on the camera body, is turned ON, control proceeds to step S1, in which the exposure calculating means 15 determines the diaphragm value and the shutter speed in accordance with the brightness data and the film sensitivity data fed from the photometering means 13 and the film sensitivity discriminating means 14, respectively. Thereafter, control proceeds to step S2.

At step S2, the photographing aperture size detecting means 12 checks whether the photographing aperture is panoramic size or standard size. If the standard photographing aperture has been selected, the diaphragm value and the shutter speed are not adjusted by the exposure adjusting means 16. Namely, the calculated diaphragm value and the corresponding shutter speed are output to the diaphragm control mechanism 18 and the shutter mechanism 17. Conversely, if at step S2 the panoramic photographing aperture has been selected, control proceeds to step S3.

At step S3, the exposure adjusting means 16 switches from the program diagram 20, for determining exposure values at the standard photographing aperture, to program diagram 21 for determining exposure values at the panoramic photographing aperture. The diaphragm value and the shutter speed determined by the exposure calculating means 15 are adjusted by adding 1 APEX value to the Av value corresponding to the diaphragm value and by subtracting 1 APEX value from the Tv value corresponding to the shutter speed. Consequently, the adjusted diaphragm value and shutter speed are fed to the diaphragm control mechanism 18 and the shutter mechanism 17.

The APEX value added to the Av value and subtracted from the Tv value is not limited to 1 and can be any value.

It is possible to set an optimum diaphragm value, in the panoramic photographing aperture position, to a size larger than a predetermined specific diaphragm value (e.g., F11), so that a shutter speed corresponding to the set diaphragm value can be calculated. Furthermore, in the case that a picture of objects located at the same distance is taken using a zoom lens, the depth of field at the object distance is deeper when a short focal length (e.g., 28 mm) of the taking lens (i.e., zoom lens) is set, than when a long focal length (e.g., 50 mm) is set. Therefore, it is advantageous to replace the F value with a larger F value (i.e., small diaphragm value), taking the focal length data into account, when a zoom lens is used as the taking lens.

As can be understood from the above discussion, according to the present invention, the depth of field can be automatically increased when the panoramic photographing aperture is selected, without a need for the photographer to manually adjust the exposure factors. Consequently, since a photographer typically makes such a depth of field adjustment when taking panoramic pictures, the present invention has provided a variable photographing aperture camera in which the photographer is relieved of this operation.

We claim:

1. A camera having a variable photographing aperture, comprising:
   means for changing a size of a photographing aperture;
   means for calculating exposure factors, including a diaphragm value and a shutter speed, in accordance with brightness of an object to be photographed; and,
   means for adjusting the exposure factors when the photographing aperture size is changed by the photographing aperture size changing means.

2. A camera according to claim 1, wherein a large photographing aperture and a small elongated photographing aperture are provided, the small elongated photographing aperture being defined by the large photographing aperture of which upper and lower portions thereof have been covered.

3. A camera according to claim 2, wherein said exposure adjusting means varies the exposure factors in a manner such that a depth of field increases when the photographing aperture is changed from a large size to a small size.

4. A camera according to claim 1, wherein said exposure calculating means and said exposure adjusting means determine an optimum exposure using different program diagrams of diaphragm value and shutter speed at the large photographing aperture and the small photographing aperture.

5. A camera according to claim 2, wherein said exposure adjusting means sets a large diaphragm value so that a depth of field is greater than a predetermined depth of field when the photographing aperture is changed from a large size to the small size by said photographing aperture changing means.

6. A camera according to claim 5, wherein a small diaphragm value is larger than F8.

7. A camera according to claim 1, further comprising a lens having a variable focal length, and a focal length modifying means for setting the focal length of the lens to a specific focal length on a short focal length side when the photographing aperture is changed from a large size to a small size by said photographing aperture changing means.

8. A camera having a photographing aperture whose size is variable, comprising:

means for changing the size of the photographing aperture between a standard size and a panoramic size;

a photographing aperture size detecting means for detecting the photographing aperture size selected by said photographing aperture size changing means;

an exposure calculating means for determining a diaphragm value and a shutter speed in accordance with brightness of an object to be photographed; and an exposure adjusting means for adjusting a combination of the diaphragm value and the shutter speed, determined by said exposure calculating means, in a manner such that the diaphragm value is larger than the diaphragm value determined by said exposure calculating means, and a shutter speed corresponds to the adjusted diaphragm value, when the photographing aperture size is changed from the standard size to the panoramic size by said photographing aperture size changing means.

9. A control method of a camera having a variable photographing aperture, including a means for changing a size of a photographing aperture between a standard size and a laterally elongated size, and an exposure calculating means for determining exposure factors including a diaphragm value and a shutter speed, in accordance with brightness of an object to be photographed, comprising:

a first step in which when the photographing aperture is changed from the standard size to the laterally elongated size, it is assumed that a photographer wants to set exposure factors that define an increased depth of field; and a second step in which the exposure factors are adjusted to increase the depth of field in accordance with the assumption in the first step.

* * * * *

UNITED STATES PATENT AND TRADEMARK OFFICE
CERTIFICATE OF CORRECTION

PATENT NO. : 5,305,051

DATED : April 19, 1994

INVENTOR(S) : Hideyuki IRIE et al.

It is certified that error appears in the above-indentified patent and that said Letters Patent is hereby corrected as shown below:

At column 6, line 56 (claim 5, line 5) of the printed patent, "the" should be ---a---.

Signed and Sealed this

Fifth Day of September, 1995

Attest:

Attesting Officer

BRUCE LEHMAN

Commissioner of Patents and Trademarks